US008993646B2

(12) United States Patent
Huang

(10) Patent No.: US 8,993,646 B2
(45) Date of Patent: Mar. 31, 2015

(54) MAKING A LITHIUM ION BATTERY SEPARATOR

(75) Inventor: Xiaosong Huang, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 601 days.

(21) Appl. No.: 13/299,480

(22) Filed: Nov. 18, 2011

(65) Prior Publication Data

US 2013/0131200 A1    May 23, 2013

(51) Int. Cl.
*C08J 5/22* (2006.01)
*H01M 2/14* (2006.01)
*H01M 2/16* (2006.01)
*B01D 67/00* (2006.01)
*B01D 69/14* (2006.01)
*H01M 10/0525* (2010.01)
*B01D 71/64* (2006.01)

(52) U.S. Cl.
CPC ............ *H01M 2/145* (2013.01); *H01M 2/1653* (2013.01); *H01M 10/0525* (2013.01); *B01D 67/0079* (2013.01); *B01D 69/148* (2013.01); *B01D 71/64* (2013.01)
USPC .................. 521/63; 521/64; 521/91; 429/249; 429/251; 429/252; 429/254

(58) Field of Classification Search
CPC ........................................................ C08J 5/22
USPC ......... 521/63, 64, 91; 429/249, 251, 252, 254
See application file for complete search history.

(56) References Cited

U.S. PATENT DOCUMENTS

| | | | | |
|---|---|---|---|---|
| 6,447,958 | B1 * | 9/2002 | Shinohara et al. | 429/248 |
| 6,537,703 | B2 * | 3/2003 | DuPasquier et al. | 429/254 |
| 7,354,531 | B2 * | 4/2008 | Boon et al. | 252/511 |
| 7,468,226 | B2 * | 12/2008 | Kwak et al. | 429/309 |

OTHER PUBLICATIONS

U.S. Appl. No. 12/974,094; Title: Battery Separators With Variable Porosity; filed Dec. 21, 2010; First Named Inventor: Hamid G. Kia.
U.S. Appl. No. 12/974,269; Title: Battery Separators With Variable Porosity; filed Dec. 21, 2010; First Named Inventor: Hamid G. Kia.
U.S. Appl. No. 13/149,205; Title: Methods of Making Lithium Ion Battery Separators; filed May 31, 2011; First Named Inventor: Xiaosong Huang.

* cited by examiner

*Primary Examiner* — Irina S Zemel
(74) *Attorney, Agent, or Firm* — Reising Ethington P.C.

(57) ABSTRACT

A porous polymer separator for use in a lithium ion battery is formed by a temperature-induced phase separation method. The porous polymer separator includes a polymer matrix having opposed major faces and a network of pore openings that extends between the major faces and permits intrusion of a lithium-ion conducting electrolyte solution. As part of the temperature-induced phase separation method, a single phase polymer solution that includes a polymer material dissolved in a miscible mixture of a real polymer solvent and a polymer non-solvent is prepared at an elevated temperature above room temperature. A film is then formed from the single phase polymer solution and cooled to phase-separate the polymer material into a solid polymer precipitate. Additional polymer non-solvent is then used to remove the real polymer solvent from the solid polymer precipitate followed by drying.

19 Claims, 2 Drawing Sheets

MAKING A LITHIUM ION BATTERY SEPARATOR

TECHNICAL FIELD

The technical field of this disclosure relates generally to separators for a secondary lithium ion battery and, more specifically, to separators formed by a thermally-induced phase separation method. In an electrochemical battery cell of a lithium ion battery, the separator is situated between confronting inner face surfaces of a positive electrode and a negative electrode and is soaked with a liquid electrolyte solution that can communicate lithium ions.

BACKGROUND

A secondary lithium ion battery is a rechargeable power source that can be implemented into a wide variety of stationary and portable applications. The structure and electrochemical reaction mechanism of this type of battery provide it with several desirable characteristics including a relatively high energy density, a relatively low internal resistance, a general non-appearance of any memory effect when compared to other types of rechargeable batteries, for example, a nickel-cadmium battery, and a low self-discharge rate. These characteristics have made the lithium ion battery the preferred mobile power source for portable consumer electronics such as laptop computers and cell phones. Larger-scale versions that interact with a multitude of interconnected systems have also been designed and manufactured by the automotive industry in an effort to improve vehicle fuel efficiency and reduce atmospheric pollution. The powertrains of hybrid electric vehicles (HEV) and extended range electric vehicles (EREV), for example, rely on the cooperative effort of multiple lithium ion batteries and a hydrocarbon-fueled internal combustion engine to generate power for vehicle operation.

A lithium ion battery generally contains one or more electrochemical battery cells that include a negative electrode, a positive electrode, and a porous separator sandwiched between confronting inner face surfaces of the electrodes. Each of these battery components is wetted with a liquid electrolyte solution that can communicate lithium ions. The negative and positive electrodes are formed of different materials that can intercalate and de-intercalate lithium ions and, when connected, establish an electrochemical potential difference. An interruptible external circuit connects the negative electrode and the positive electrode to provide an electrical current path around the separator to electrochemically balance the migration of lithium ions through the separator between the electrodes. Metallic current collectors intimately associated with each electrode supply and distribute electrons to and from the external circuit depending on the operating state of the electrochemical battery cell. The external circuit can be coupled to an electrical load (during discharge) or an applied voltage from an external power source (during charging) through conventional electronic connectors and related circuitry.

The porous separator includes opposed major face surfaces that intimately contact the confronting inner face surfaces of the electrodes. A main function of the separator is to provide a porous and electrically insulative mechanical support barrier between the negative and positive electrodes to prevent a short-circuit. Conventionally, the porous separator has been composed of a polyolefin such as polyethylene and/or polypropylene. A number of fabrication methods have been developed for making a polyolefin separator with its intended porosity. The separator may be formed by a dry technique in which a polyolefin polymer is melted, extruded into a film, annealed, and then uniaxially stretched. The separator may also be formed by a wet technique in which a polyolefin polymer is mixed with a hydrocarbon or other low-molecular weight liquid substance. The mixture is then heated, melted, extruded into a sheet, and biaxially stretched. Afterwards, the hydrocarbon or other low-molecular weight liquid substance is extracted.

A polyolefin separator, however, is potentially susceptible to certain performance declines when heated excessively. Exposure of the electrochemical battery cell to temperatures of 80° C. and above can cause the polyolefin separator to shrink, soften, and even melt. Such high temperatures can be attributed to charging-phase heat generation, ambient atmospheric temperature, or some other source. The physical distortion of the polyolefin separator may ultimately permit direct electrical contact between the negative and positive electrodes and cause the electrochemical cell to short-circuit. Battery thermal runaway is also a possibility if the electrodes come into direct electrical contact with one another to an appreciable extent. This inability of a polyolefin separator to maintain thermal stability at temperatures exceeding 80° C. for prolonged periods is a potential concern for some lithium ion battery applications.

Several engineering polymers that exhibit better thermal stability than polypropylene and polyethylene have been investigated as candidates for the separator in an effort to enhance the temperature operating window of a lithium ion battery. But the separator fabrication methods often used for polyolefin separators generally cannot provide these types of polymers with a sufficient and uniform porosity across their thickness at reasonable costs. The stretching techniques often employed in conventional polyolefin separator manufacturing processes has also been shown to adversely affect the dimensional stability of engineering polymer separators at elevated temperatures above 80° C. and, more noticeably, above 100° C. A fabrication method that can reliably produce, from a variety of engineering polymers, a thermally stable polymer separator having a generally uniform network of pores defined across its thickness is therefore needed.

SUMMARY OF THE DISCLOSURE

A porous polymer separator for use in a lithium ion battery may be fabricated by a thermally-induced phase separation method. The porous polymer separator comprises a polymer matrix that defines a network of pore openings which extends between major face surfaces of the polymer matrix. The polymer matrix is formed by first dissolving a polymer material into a miscible mixture of at least two liquids—namely, a solvent that can dissolve the particular polymer material chosen and a liquid that cannot—at an elevated temperature conducive to solvation of the polymer material to form a single phase polymer solution. A film is then formed from the single phase polymer solution and allowed to cool from the elevated temperature. Cooling the film causes the dissolved polymer material to phase-separate into a solid polymer precipitate and a collection of internally disseminated liquid confinements. The solid polymer precipitate is then exposed to additional non-solvent liquid and dried to form the polymer matrix.

One particular practice of the thermally-induced phase separation method involves preparing a single phase polymer solution that includes a polymer material dissolved in a miscible mixture of a real polymer solvent and a polymer non-solvent at an elevated temperature above room temperature. The term "single phase" as used here signifies that the polymer solution is a liquid substance in which each component (polymer material, real polymer solvent, and polymer non-solvent) is homogenously allocated throughout the polymer solution without any recognizable liquid-liquid or solid-liquid phase separations. The elevated temperature at which the single phase polymer solution is prepared is, in general, any temperature that facilitates solvation of the polymer material in the miscible mixture of the real polymer solvent and the polymer non-solvent. And while this temperature is dependent on the identity of the polymer material, the real polymer solvent, and the polymer non-solvent, as well as the quantity of each of those components in the polymer solution, it usually falls somewhere in the range of about 40° C. to about 80° C.

The polymer material included in the single phase polymer solvent is preferably an engineering polymer that is thermally stable and generally chemically inert to the liquid electrolyte solution encountered in the operating environment of a lithium ion battery. Several examples of such engineering polymers include, for example, polyetherimide, polyvinylidene fluoride, polyethersulfone, polysulfone, polyphenylsulfone, polyacrylonitrile, poly(methyl methacrylate), an aliphatic polyamide, an aromatic polyamide, cellulose and its derivatives, a polycarbonate, a polyurethane, or mixtures thereof. These polymer materials are preferred because they exhibit better thermal stability than polyethylene and polypropylene and are readily commercially available at reasonable costs. Such heat resistance allows these polymer materials to maintain their functionality for longer durations than a conventional polyolefin if the temperature in the lithium ion battery unexpectedly rises.

The real polymer solvent is a solvent can dissolve the chosen polymer material at room temperature and the polymer non-solvent is a liquid which cannot dissolve more than an inconsequential amount of the chosen polymer material at any temperature up to the elevated temperature. The real polymer solvent and the polymer non-solvent that make up the miscible mixture and dissolve the polymer material at the elevated temperature depend, for the most part, on the identity of particular polymer material being dissolved. In preferred embodiments, however, the real polymer solvent is one of N-methyl-2-pyrrolidone, dimethyl formamide, tetrahydrofuran, dimethyl sulfoxide, ethylene carbonate, propylene carbonate, diethyl carbonate, ethylenediamine, acetone, aqueous acetic acid, aqueous sulfuric acid, or mixtures thereof, and the polymer non-solvent is one of water, a C1-C6 aliphatic alcohol (i.e., methanol, ethanol, n-propanol, iso-propanol, butanol, pentanol, etc.), acetone, or mixtures thereof.

The single phase polymer solution is prepared, generally speaking, with amounts of the polymer material, the real polymer solvent, and the polymer non-solvent that are needed to make the porous polymer separator with its intended thickness and porosity. A typical composition of the polymer solution often includes about 5 wt. % to about 35 wt. % of the polymer material with the real polymer solvent and the polymer non-solvent being present in the miscible mixture at about 30 wt. % to about 99.5 wt. % and about 0.5 wt. % to about 70 wt. %, respectively, based on the total weight of the miscible mixture exclusive of the polymer material. Also, if desired, ceramic and/or polymer particles (hereafter referred to simply as "particles") may be dispersed in the single phase polymer solution to enhance the lithium ionic conductance of the porous polymer separator ultimately produced. These particles are preferably added to the single phase polymer solution at an amount that ranges from about 5 wt. % to about 900 wt. % of the dissolved polymer material.

After preparation of the single phase polymer solution, a film of the polymer solution (with or without the particles) is then formed to a desired thickness suitable for production of the porous polymer separator. A film thickness of up to about 150 µm, for instance, is usually employed to make a porous polymer separator having a thickness in the range of about 10 µm to about 50 µm. The film may be formed onto a stationary or moveable substrate surface by any appropriate technique such as, for example, spraying, doctor blading, slot die coating, comma bar coating, or liquid extrusion. A few examples of stationary and moveable substrate surfaces include a conveyor belt, a support belt, a glass surface, a metal foil, an electrode, or a ceramic sheet. But of course the film may be formed on other similar substrate surfaces as understood by skilled artisans.

The film is then cooled from the elevated temperature to phase separate the polymer material into a solid polymer precipitate with a collection of very small liquid beads, droplets, or other confinements uniformly disseminated within the solid polymer precipitate. This type of thermally-induced phase separation occurs because the miscible mixture of the real polymer solvent and the polymer non-solvent losses its ability to dissolve the polymer material as the temperature drops from the elevated temperature. The solid polymer precipitate is composed primarily of the polymer material and the particles, if present, with the remainder typically being absorbed real polymer solvent. The internally disseminated collection of liquid confinements, on the other hand, is composed of the polymer non-solvent, the real polymer solvent, a very small amount of any still-dissolved polymer material, and, if present, the particles. The amount of the polymer solvent in the liquid confinements could be significant; but it generally losses its ability to dissolve the polymer material when mixed with the polymer non-solvent at temperatures below the elevated temperature. The cooling of the film from the elevated temperature is preferably accomplished by ensuring the temperature of the substrate surface upon which the film is formed is less than the elevated temperature.

Next, the solid polymer precipitate is exposed to additional polymer non-solvent to remove, by solvent exchange, the real polymer solvent from within the solid polymer precipitate. Such a solvent exchange mechanism involves displacing and/or extracting the real polymer solvent absorbed into the solid polymer precipitate and the real polymer solvent contained in the internally disseminated collection of liquid confinements with the additional polymer non-solvent. The solid polymer precipitate is preferably exposed to the polymer non-solvent so that at least 70 wt. %, and preferably at least 95 wt. %, of the real polymer solvent contained within the solid polymer precipitate is exchanged with the polymer non-solvent. Removing the real polymer solvent in exchange for the polymer non-solvent induces further precipitation of any polymer material still dissolved and makes it easier to dry the solid polymer precipitate. The additional polymer non-solvent exposed to the solid polymer precipitate may be the same or different from the polymer non-solvent used to prepare the single phase polymer solution.

The solid polymer precipitate is then dried to remove the polymer non-solvent and any residual real polymer solvent. The resultant material is a porous polymer separator that includes a polymer matrix composed of the polymer material originally dissolved in the single phase polymer solution. The polymer matrix has a thickness defined by opposed major face surfaces. A network of pore openings, which is attributed to the formation of the internally disseminated collection of liquid confinements within the solid polymer precipitate followed by solvent-exchange and then removal of the liquid confinements, extends between the major face surfaces and is uniformly defined within the polymer matrix. The polymer matrix is preferably about 10 µm to about 50 µm thick and the network of pore openings preferably provides the polymer matrix with a finely divided void volume in the range of about 30% to about 90%. If the particles are present, the polymer matrix preferably comprises about 10 wt. % to about 95 wt. % of the polymer material and about 5 wt. % to about 90 wt. % of the particles internally distributed throughout the polymer matrix.

DETAILED DESCRIPTION

A porous polymer separator for use in a lithium ion battery can be made by a thermally-induced phase separation method. The separator comprises a polymer matrix formed preferably from an engineering polymer material. The polymer matrix has opposed major face surfaces that are intended to experience interfacial contact with confronting inner face surfaces of a negative electrode and a positive electrode when assembled into an electrochemical battery cell of a lithium ion battery. A preferred thickness of the polymer matrix, as defined by the distance between the opposed major face surfaces, is about 10 µm to about 50 µm. A network of pore openings that traverses the thickness of the polymer matrix and fluidly connects the major face surfaces is defined uniformly within the polymer matrix. This network of pore openings provides the polymer matrix with a finely divided void volume in the range of about 30% to about 90% and permits intrusion of a liquid electrolyte solution so that lithium ions can migrate from one side of the polymer matrix to the other. Ceramic and/or polymer particles may optionally be distributed throughout the polymer matrix, if desired, to help improve the ionic conductance of lithium ions. The particles may be present such that the polymer matrix comprises about 10 wt. % to about 95 wt. % of the polymer material and about 5 wt. % to about 90 wt. % of the internally distributed particles.

Figure 1:
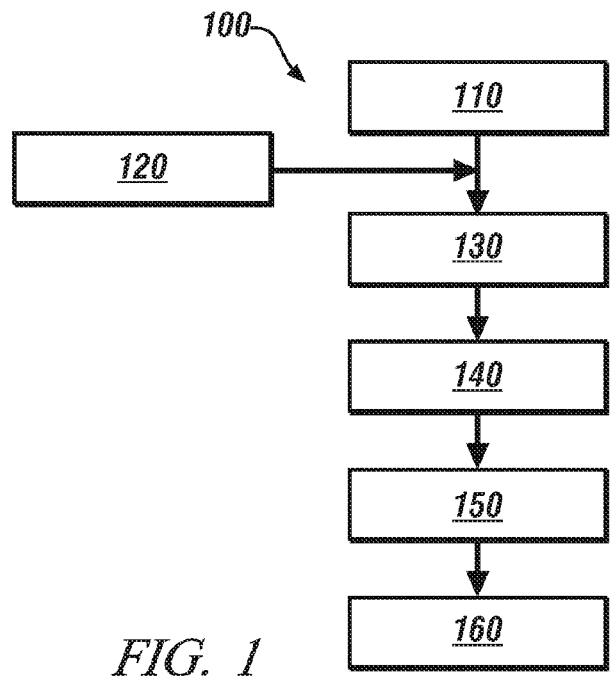
FIG. 1 is a flow chart that depicts a thermally-induced phase separation method for making a porous polymer separator that can be used in an electrochemical battery cell of a lithium ion battery.

A flow chart that generally depicts the thermally-induced phase separation method, represented as numeral 100, is shown in FIG. 1. The thermally-induced phase separation method involves preparing, at an elevated temperature above room temperature, a single phase polymer solution that includes a polymer material dissolved in a miscible mixture of a real polymer solvent and a polymer non-solvent that is compatible with that particular polymer material selected (act 110). The polymer solution is prepared at the elevated temperature because the miscible mixture of the real polymer solvent and the polymer non-solvent is generally not conducive to solvation of the polymer material at room temperature. After the single phase polymer solution is prepared, a film is formed from the polymer solution to a desired thickness (act 130) and then cooled from the elevated temperature to phase-separate the polymer material into a solid polymer precipitate (act 140). The solid polymer precipitate is then exposed to additional polymer non-solvent to remove the real polymer solvent (act 150) followed by drying to form the porous polymer separator with its intended physical and chemical properties (act 160). The particles may be dispersed within the single phase polymer solution before the film is formed if they are meant to be present in the polymer matrix of the porous polymer separator (act 120).

The polymer material, as already mentioned, is preferably an engineering polymer that is thermally stable and generally chemically inert to the liquid electrolyte solution encountered in the operating environment of a lithium ion battery. Some exemplary polymer materials that may be employed include polyetherimide (PEI), polyvinylidene fluoride (PVdF), polyethersulfone (PES), polysulfone (PSf), polyphenylsulfone (PPSf), polyacrylonitrile (PAN), poly(methyl methacrylate) (PMMA), an aliphatic polyamide (PA) such as polyhexamethylene adipamide (nylon 6,6) and polycaprolactam (nylon 6), an aromatic polyamide such as polyparaphenylene terephthalamide (i.e., Kevlar®), cellulose, cellulose derivatives such as cellulose acetate and carboxymethyl cellulose, a polycarbonate (PC), a polyurethane (PU) such as polyether- and polyester-based polyurethanes, and mixtures thereof. Each of these polymer materials is thermal stable at temperatures of 130° C. and above. Such heat resistance allows these polymer materials to maintain their functionality for longer durations than a conventional polyolefin if the temperature in the lithium ion battery unexpectedly rises. PEI, PSf, PPSf and PVdF are the most preferred polymer materials because they are the easiest to manufacture into the polymer matrix of the porous polymer separator and provide a good balance of mechanical and electromechanical performance.

The real polymer solvent is a solvent that dissolves the polymer material at room temperature of about 20° C.; that is, there is interaction, mixing, and stabilization of the real polymer solvent and the polymer material on the molecular level. To quantify this molecular attraction, the real polymer solvent generally exhibits a solubility of at least 5 grams of the polymer material per 100 grams of solvent at room temperature. The polymer non-solvent, on the other hand, is a liquid that does not dissolve more than an inconsequential amount of the polymer material—no more than 0.50 grams of the polymer material per 100 grams of the polymer non-solvent—at any temperature up to the elevated temperature. These two types of liquids are mixed into the miscible mixture that dissolves the polymer material so that, when the polymer material is later precipitated into the solid polymer precipitate, a collection of very small beads, droplets, or other liquid confinements comprised primarily of the polymer non-solvent and the real polymer solvent, and the particles if present, is uniformly disseminated throughout the solid polymer precipitate. Very little, if any, of the polymer material remains dissolved in these liquid confinements, especially at room temperature, because of the existence of the polymer non-solvent. The network of pore openings defined in the polymer matrix of the porous polymer separator is ultimately derived from this internal dissemination of liquid confinements.

Several different real polymer solvents and polymer non-solvents may be used in conjunction with one another depending on the particular polymer material chosen. For example, in preferred embodiments, the real polymer solvent is usually one of N-methyl-2-pyrrolidone, dimethyl formamide, tetrahydrofuran, dimethyl sulfoxide, ethylene carbonate, propylene carbonate, diethyl carbonate, ethylenediamine, acetone, aqueous acetic acid, aqueous sulfuric acid or a mixture thereof, and the polymer non-solvent is usually one of water, an C1-C6 aliphatic alcohol (i.e., methanol, ethanol, n-propanol, iso-propanol, butanol, pentanol, etc.), acetone, or a mixture thereof. A list of these preferred real polymer solvents and polymer non-solvents and their relation to the several polymer materials previously mentioned is shown below in Table 1.

TABLE 1

Solvent-Types for Various Polymer Materials

| Polymer Material | Miscible Mixture of Real Polymer Solvent and Polymer Non-Solvent | |
|---|---|---|
| | Real Polymer Solvent | Polymer Non-Solvent |
| PEI | N-Methyl-2-Pyrrolidone (NMP) | Water, Aliphatic Alcohol, Acetone |
| PVdF | N-Methyl-2-Pyrrolidone (NMP), Dimethyl Formamide (DMF), Acetone, Tetrahydrofuran (THF) | Water, Aliphatic Alcohol |
| PES | Tetrahydrofuran (THF), N-Methyl-2-Pyrrolidone (NMP), Dimethyl Formamide (DMF) | Water, Aliphatic Alcohol, Acetone |
| PSf, PPSf | N-Methyl-2-Pyrrolidone (NMP), Dimethyl Formamide (DMF) | Water, Aliphatic Alcohol, Acetone |
| PAN | N-Methyl-2-Pyrrolidone (NMP), Dimethyl Formamide (DMF) | Water, Aliphatic Alcohol, Acetone |
| PMMA | N-Methyl-2-Pyrrolidone (NMP), Dimethyl Formamide (DMF), Dimethyl Sulfoxide (DMSO), Acetone | Water, Aliphatic Alcohol |
| Aliphatic PA | Aqueous Acetic Acid | Water, Aliphatic Alcohol |
| Aromatic PA | Aqueous Sulfuric Acid | Water |
| Cellulose | Ethylenediamine with dissolved potassium thiocyanate | Water, Aliphatic Alcohol |
| Cellulose derivatives | N-Methyl-2-Pyrrolidone (NMP), Dimethyl Formamide (DMF) | Water |
| PC | N-Methyl-2-Pyrrolidone (NMP), Dimethyl Formamide (DMF), Dimethyl Sulfoxide (DMSO) | Water, Aliphatic Alcohol |
| PU | N-Methyl-2-Pyrrolidone (NMP), Dimethyl Formamide (DMF), Dimethyl Sulfoxide (DMSO) | Water |

The particles optionally dispersed within the single phase polymer solution may included those of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, polyethylene, polypropylene, ethylene-vinyl acetate, polystyrene, an epoxy such as the reaction product of epichlorohydrin and bisphenol-A, a polyketone such as the reaction product of ethylene and carbon monoxide in slurry or in the gas phase over a catalyst, or some other suitable ceramic or polymer material. A preferred particle diameter for the particles is about 0.005 μm to about 15 μm and, most preferably, from about 0.05 μm to about 3 μm.

A specific and most preferred particle is fumed (pyrogenic) silica that has been surface modified with organosilicon compounds by way of a silanol condensation reaction. Fumed silica particles are usually prepared through the flame pyrolysis of silicon tetrachloride or quartz sand. Several different companies commercially manufacture such hydrophobic-treated fumed silica particles. AEROSIL® 8202 and AEROSIL® R805, for example, can be obtained from Evonik Degussa Corporation (Parsippany, N.J.). AEROSIL® R202 is a high-purity, fumed silica particulate that has been surface-treated with a polydimethylsiloxane. AEROSIL® R805 is a high-purity, fumed silica particulate that has been surface-treated with an octylsilane. As another example, CAB-O-SIL® TS-382 and CAB-O-SIL® TS-720 can be obtained from Cabot Corporation (Boston, Massachuesetts). CAB-O-SIL® TS-382, which is similar to AEROSIL® R805, is a high-purity, fumed synthetic silica particulate that has been surface-treated with an octylsilane. CAB-O-SIL® TS-720, which is similar AEROSIL® 8202, is a high-purity, fumed synthetic silica particulate that has been surface-treated with a polydimethylsiloxane. Each of these products contain surface-substituted organisilicon polymers derived from polydimethylsiloxane (AEROSIL® 8202 and CAB-O-SIL® TS-720) or octylsilane (AEROSIL® R805 and CAB-O-SIL® TS-382) in lieu of hydroxyl groups as a result of silanol condensation reactions.

The single phase polymer solution is prepared with amounts of the polymer material, the real polymer solvent, and the polymer non-solvent that are needed to make the porous polymer separator with its intended thickness and porosity. A typical composition of the polymer solution often includes about 5 wt. % to about 35 wt. % of the polymer material with the real polymer solvent and the polymer non-solvent being present in the miscible mixture at about 30 wt. % to about 99.5 wt. % and about 0.5 wt. % to about 70 wt. %, respectively, based on the total weight of the miscible mixture exclusive of the polymer material. The elevated temperature at which the polymer solution is prepared is any temperature that facilitates adequate solvation of the polymer material in the miscible mixture of the real polymer solvent and the polymer non-solvent. Exactly what constitutes the elevated temperature is variable because it depends on the identity of the polymer material, the real polymer solvent, and the polymer non-solvent, as well as the quantity of each of those components in the single phase polymer solution. But in most instances the elevated temperature lies somewhere between about 40° C. and about 80° C. If the particles are dispersed within the single phase polymer solution, they are preferably added at an amount that ranges from about 5 wt. % to about 900 wt. %, and more preferably from about 10 wt. % to about 100 wt. %, of the dissolved polymer material.

The single phase polymer solution is preferably prepared in one of two ways. One technique includes dissolving the polymer material in the real polymer solvent at a temperature below the elevated temperature—typically at room temperature of about 20° C.—to form an initial polymer solution. The initial polymer solution is then heated to the elevated temperature which, as mentioned before, is conducive to solvation of the polymer material in the miscible mixture of the real polymer solvent and the polymer non-solvent. Once heated to the appropriate extent, the polymer non-solvent is added to the initial polymer solution to form the single phase polymer solution. Another technique for preparing the single phase polymer solution includes mixing the real polymer solvent and the polymer non-solvent at a temperature below the elevated temperature—again, typically room temperature of about 20° C.—to form the miscible mixture of the real polymer solvent and the polymer non-solvent. The miscible solvent mixture is then heated to the elevated temperature. Once heated to the appropriate extent, the polymer material is dissolved in the miscible mixture of the real polymer solvent and the polymer non-solvent to form the single phase polymer solution. Mechanical stirring, agitation, and/or sonication can be used when appropriate in both techniques to dissolve the polymer material, and, if applicable, disperse the particles within the single phase polymer solution.

After the single phase polymer solution is prepared (with or without the particles), the film is formed from the polymer solution to a desired thickness. Any suitable technique including spraying, doctor blading, slot die coating, comma bar coating, or liquid extrusion may be used to derive the film from the single phase polymer solution. The film may be formed onto a moveable or immovable substrate surface such as, for example, a conveyor belt, a support belt, a glass surface, a ceramic sheet, a metal foil, an electrode, or some other appropriate surface. The desired thickness of the film is generally chosen so that the final prepared porous polymer separator is anywhere from about 10 μm to about 50 μm thick. This could entail forming the film to a thickness somewhere in the range of about 20 μm to about 150 μm to compensate for shrinkage of the wet solid polymer precipitate into the dry porous polymer separator. Other conventional film forming techniques may of course be utilized, as understood by skilled artisans, to accomplish the general objectives just described.

The film is then cooled from the elevated temperature to phase-separate the polymer material into the solid polymer precipitate. More specifically, during such cooling, and without being bound by theory, the film phase-separates into the solid polymer precipitate and the collection of very small liquid confinements within the solid polymer precipitate because the existence of the polymer non-solvent renders the miscible mixture of the real polymer solvent and the polymer non-solvent unable to dissolve the polymer material. The cooling of the film from the elevated temperature is preferably accomplished by ensuring the temperature of the substrate surface upon which the film is formed is less than the elevated temperature. For example, forming the film onto the substrate surface, which has achieved room temperature, is generally sufficient although lower substrate surface temperatures and the use of cooling equipment, such as fans, may be employed if desired.

The solid polymer precipitate is composed primarily of the polymer material and the particles, if present, with the remainder typically being absorbed real polymer solvent. The internally disseminated collection of liquid confinements, on the other hand, as previously intimated, is composed of the polymer non-solvent, the real polymer solvent, any still-dissolved polymer material, and, if present, the particles. The presence of this internal dissemination of liquid confinements within the solid polymer precipitate pre-establishes what will eventually become the network of pore openings in the polymer matrix of the porous polymer separator. Moreover, the particles, if dispersed throughout the film, promote pore and gap formation in their immediate vicinity during phase-separation of the solid polymer precipitate and help connect adjacent pore openings to create an open, interconnected network of the pore openings.

Next, the solid polymer precipitate is exposed to additional polymer non-solvent to remove, by solvent exchange, the real polymer solvent from within the solid polymer precipitate. Such a solvent exchange mechanism involves displacing and/or extracting the real polymer solvent absorbed into the solid polymer precipitate and the real polymer solvent contained in the internally disseminated collection of liquid confinements with the additional polymer non-solvent. The solid polymer precipitate may be exposed to the polymer non-solvent by any suitable technique. For example, the solid polymer precipitate may be washed with a flow of the polymer non-solvent and/or immersed in a bath of the polymer non-solvent. The solid polymer precipitate is preferably exposed to the polymer non-solvent so that at least 70 wt. %, and preferably at least 95 wt. %, of the real polymer solvent contained within the solid polymer precipitate is exchanged with the polymer non-solvent. This degree of solvent exchange generally does not require long exposure times; a few seconds to a few minutes is usually all the time that is needed. The additional polymer non-solvent exposed to the solid polymer precipitate may be the same or different from the polymer non-solvent used to prepare the single phase polymer solution.

After exposure to the additional polymer non-solvent, the solid polymer precipitate is dried to form the polymer matrix of the porous polymer separator. The drying of the solid polymer precipitate removes the polymer non-solvent and any residual of the real polymer solvent through evaporation. The removal of these liquids leaves behind empty pores and crevices that provide the uniform network of pore openings in the polymer matrix with its ascribed porosity (i.e., the finely divided void volume). The existence of the particles, if present in the solid polymer precipitate, exacerbates the complexity and extent of the network of pore openings defined in the polymer matrix. Any suitable drying technique may be used to remove the polymer non-solvent and any residual of the real polymer solvent from the solid polymer precipitate. The solid polymer precipitate may, for example, be subjected to a stream of hot air or some other non-reactive gas, placed in an oven or furnace, passed under a series of heat lamps, or allowed to dry naturally at room temperature, to name but a few possible heating techniques.

The resultant porous polymer separator is thin, handleable, and more thermally stable than conventional polyethylene and polypropylene separators. The polymer matrix of the separator includes opposed major face surfaces between which a network of pore openings uniformly extends to provide the polymer matrix with a finely divided void volume in the range of about 30% to about 90%. The bulk and surface porosity of the polymer matrix fluidly connects the opposed major face surfaces and permits adequate infiltration of a liquid electrolyte solution so that ionic conductivity through the polymer matrix can be maintained during operation of an electrochemical battery cell within a lithium ion battery. If the particles are included in the porous polymer separator, the polymer matrix preferably comprises about 10 wt. % to about 95 wt. %, and more preferably about 50 wt. % to about 90 wt. %, of the polymer material and about 5 wt. % to about 90 wt. %, and more preferably about 10 wt. % to about 50 wt. %, of the particles. A preferred thickness of the polymer matrix as defined by the distance between the opposed major face surfaces is about 10 μm to about 50 μm.

Figure 2:
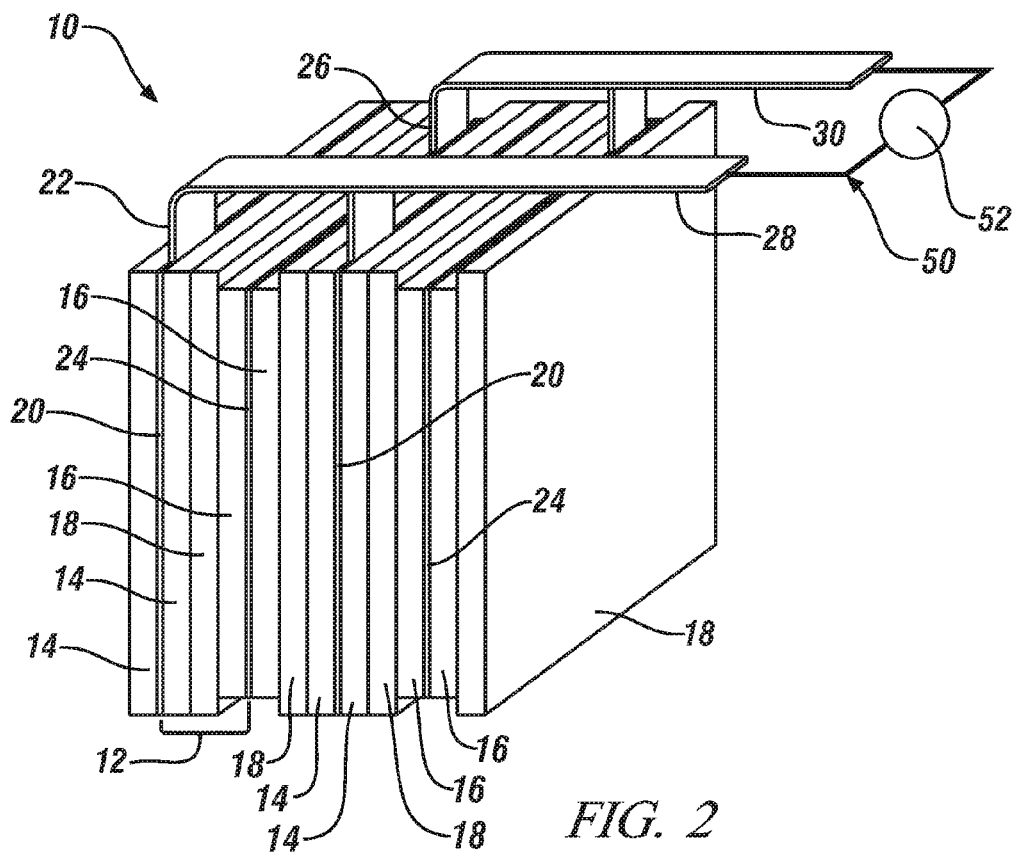
FIG. 2 is a generalized perspective illustration of a lithium ion battery that includes several adjacent electrochemical battery cells, each of which includes a negative electrode, a positive electrode, and a separator sandwiched between the two electrodes.

A porous polymer separator fabricated by the thermally-induced phase separation method just described may be used in a wide variety of lithium ion battery configurations. An exemplary and generalized illustration of a lithium ion battery 10 is depicted in FIG. 2. The lithium ion battery 10 shown here includes several rectangularly-shaped electrochemical battery cells 12 that are each bracketed by metallic current collectors. Anywhere from 5 to 150 of the electrochemical battery cells 12 are typically stacked side-by-side in a modular configuration and connected in series (although a parallel connection is also permitted) if the lithium ion battery 10 is intended for use in a vehicle powertrain. The lithium ion battery 10 can be further connected serially or in parallel to other similarly constructed lithium ion batteries to form a lithium ion battery pack that exhibits the voltage and current capacity demanded for a particular vehicle application. It should be understood the lithium ion battery 10 shown here is only a schematic illustration. FIG. 2 is not intended to inform the relative sizes of the electrochemical battery cells' components or to limit the wide variety of structural configurations the lithium ion battery 10 may assume. Various structural modifications to the lithium ion battery 10 shown in FIG. 2 are possible despite what is explicitly illustrated.

The electrochemical battery cell 12 includes a negative electrode 14, a positive electrode 16, and a separator 18 situated between the two electrodes 14, 16. Each of the negative electrode 14, the positive electrode 16, and the separator 18 is wetted with a liquid electrolyte solution that is able to communicate lithium ions. A negative-side metallic current collector 20 that includes a negative polarity tab 22 is located between the negative electrodes 14 of adjacent electrochemical cells 12. Likewise, a positive-side metallic current collector 24 that includes a positive polarity tab 26 is located between neighboring positive electrodes 16. The negative polarity tab 22 is electrically coupled to a negative terminal 28 and the positive polarity tab 26 is electrically coupled to a positive terminal 30. An applied compressive force usually presses the metallic current collectors 20, 24, against the electrodes 14, 16 and the electrodes 14, 16 against the separator 18 to achieve intimate interfacial contact between the several contacting components. At least one, and preferably all, of the separators 18 employed in the electrochemical battery cells 12 of the lithium ion battery 10 may be constructed from an engineering polymer and formed by the thermally-induced phase separation method detailed above.

Figure 3:
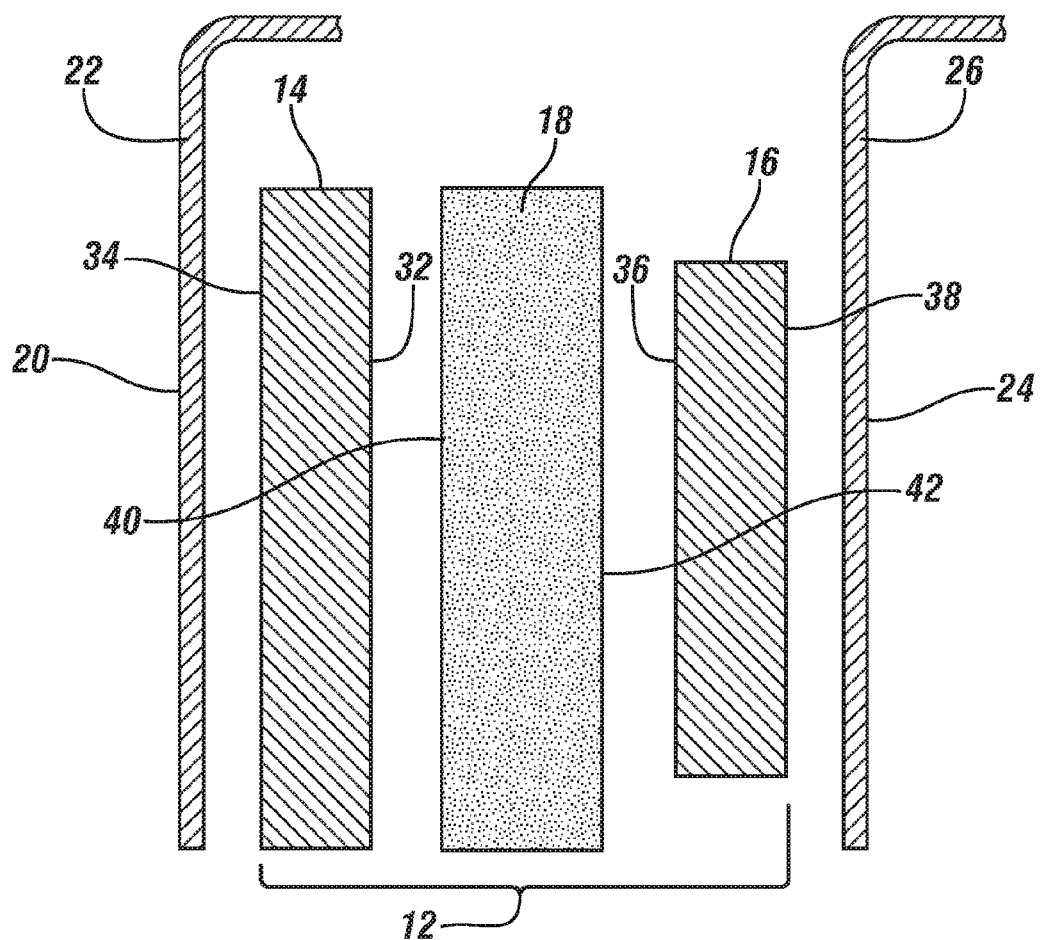
FIG. 3 is an exploded cross-sectional view of one of the electrochemical battery cells shown in FIG. 2 along with its associated metallic current collectors. The components of the electrochemical battery cell and the metallic current collectors are idealized representations that are not necessarily drawn to scale.

An exploded cross-sectional view of the electrochemical battery cell 12 and its associated metallic current collectors 20, 24 is generally illustrated in FIG. 3. The negative electrode 14 includes an inner face surface 32 and an outer face surface 34 relative to the location of the separator 18. The positive electrode 14 similarly includes an inner face surface 36 and an outer face surface 38. The inner face surface 32 of the negative electrode 14 may, but is not required to, encompass a larger two-dimensional surface area than the inner face surface 36 of the positive electrode 16, as shown. When assembled into the electrochemical battery cell 12, the inner face surfaces 32, 36 of the negative and positive electrodes 14, 16 confront one another and are pressed against a negative-side major face surface 40 and a positive-side major face surface 42 of the separator 18, respectively. Such pressed-engagement occurs generally uniformly along the entire interface of the major face surfaces 40, 42 of the separator 18 and the corresponding portions of the inner face surfaces 32, 36 of the electrodes 14, 16. The negative-side metallic current collector 20 supports the outer face surface 34 of the negative electrode 14 and the positive-side metallic current collector 24 supports the outer face surface 38 of the positive electrode 16. Both of the metallic current collectors 20, 24 engage their respective electrode outer face surfaces 34, 38 over an appreciable interfacial surface area to facilitate the efficient collection and distribution of free electrons.

The electrochemical battery cell 12 is generally thin and flexible. A typical thickness of the electrochemical battery cell 12 extending from the outer face surface 34 of the negative electrode 12 to the outer face surface 38 of the positive electrode 16 is about 70 μm to about 350 μm. Each electrode 14, 16 is preferably about 30 μm to 150 μm thick and, as already mentioned, the separator 18 is about 10 μm to 50 μm thick. The metallic current collectors 20, 24 are normally about 5 μm to 20 μm thick. The relatively thin and flexible nature of the electrochemical battery cell 12 and its associated metallic current collectors 20, 24 allows them to be rolled, folded, bent, or otherwise maneuvered into a variety of lithium ion battery configurations depending on design specifications and spatial constraints. The lithium ion battery 10 may, for example, include a number of distinct electrochemical battery cells 12 that have been fabricated, cut, aligned, and layed-up next to one another or, in an alternative embodiment, the cells 12 may be derived from a continuous layer that is folded back-and-forth over itself many times.

The negative electrode 14 includes a lithium host material that stores intercalated lithium at a relatively low electrochemical potential (relative to a lithium metal reference electrode) such as, for example, graphite or lithium titanate. The lithium host material may be intermingled with a polymeric binder material to provide the negative electrode 14 with structural integrity. The lithium host material is preferably graphite and the polymeric binder material is preferably one or more of polyvinyldiene fluoride (PVdF), an ethylene propylene diene monomer (EPDM) rubber, styrene butadiene rubber (SBR), a carboxymethoxy cellulose (CMC), or mixtures thereof. Graphite is normally used to make the negative electrode 14 because, on top of being relatively inert, its layered structure exhibits favorable lithium intercalation and deintercalation characteristics which help provide the electrochemical battery cell 12 with a suitable energy density. Commercial forms of graphite that may be used to construct the negative electrode 14 are available from Timcal Graphite and Carbon (headquartered in Bodio, Switzerland), Lonza Group (headquartered in Basel, Switzerland), and Superior Graphite (headquartered in Chicago, Ill.). The negative-side metallic current collector 20 associated with the negative electrode 14 is preferably a thin-film copper foil that coextensively contacts the outer face surface 34 of the negative electrode 14.

The positive electrode 16 includes a lithium-based active material that stores intercalated lithium at a higher electrochemical potential than the lithium host material used to make the negative electrode 14 (also relative to a lithium metal reference electrode). The same polymeric binder materials that may be used to construct the negative electrode 14 (PVdF, EPDM, SBR, CMC) may also be intermingled with the lithium-based active material to provide the positive electrode 16 with structural integrity. The lithium-based active material is preferably a layered lithium transition metal oxide, such as lithium cobalt oxide ($LiCoO_2$), a spinel lithium transition metal oxide, such as spinel lithium manganese oxide ($LiMn_2O_4$), a lithium polyanion, such as a nickel-manganese-cobalt oxide [$Li(Ni_XMn_YCO_Z)O_2$], lithium iron phosphate ($LiFePO_4$), or lithium fluorophosphate ($Li_2FePO_4F$), or a mixture of any of these materials. Some other suitable lithium-based active materials that may be employed as all or part of the lithium-based active material include lithium nickel oxide ($LiNiO_2$), lithium aluminum manganese oxide ($Li_xAl_yMn_{1-y}O_2$), and lithium vanadium oxide ($LiV_2O_5$), to name but a few alternatives. The positive-side metallic current collector 24 associated with the positive electrode 16 is preferably a thin-film aluminum foil that coextensively contacts the outer face surface 38 of the positive electrode 16.

The separator 18 functions as a thin and electrically insulative mechanical barrier layer that physically separates the confronting inner face surfaces 32, 36 of the electrodes 14, 16 to prevent a short-circuit in the electrochemical battery cell 12. The separator 18 is also sufficiently porous to permit infiltration of the liquid electrolyte solution and the internal passage of dissolved lithium ions. A rise in temperature that breaches 80° C. in the electrochemical battery cell 12 can be endured by the separator 18 without a sacrifice in functionality if the separator 18 has been made according to the thermally-induced phase separation method detailed above. This is because the engineering polymer material used to make the separator 18 will not soften, melt, chemically react with the liquid electrolyte solution, or experience dimensional shrinkage at such temperatures as is often the case with a polyolefin. Dimensional shrinkage is avoided because the manufacture of the separator 18 does not require significant stretching to form the network pore openings, as is often the case with polyolefin separators. The ability of the separator 18 to withstand potential spikes in temperature provides the electrochemical battery cell 12 with durability and helps prevent short-circuit events that may cause the cell 12 to lose capacity or fail altogether.

The liquid electrolyte solution infiltrated into the separator 18, and which wets both electrodes 14, 16, is preferably a lithium salt dissolved in a non-aqueous solvent. Some suitable lithium salts that may be used to make the liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Referring now back to FIG. 2, the negative and positive terminals 28, 30 of the lithium ion battery 10 may be connected to an electrical device 52 as part of an interruptible circuit 50 established between the negative electrodes 14 and the positive electrodes 16 of the many electrochemical battery cells 12. The electrical device 52 may be a wide variety of electrical loads and power-generating devices. An electrical load is a power-consuming device that is powered fully or partially by the lithium ion battery 10. Conversely, a power-generating device is one that charges or re-powers the lithium ion battery 10 through an applied external voltage. The electrical load and the power-generating device can be the same device in some instances. For example, the electrical device 52 may be an electric motor for a hybrid electric or an extended range electric vehicle that is designed to draw an electric current from the lithium ion battery 10 during acceleration and provide a regenerative electric current to the lithium ion battery 10 during deceleration. The electrical load and the power-generating device can also be different devices. For example, the electrical load may be an electric motor for a hybrid electric or an extended range electric vehicle and the power-generating device may be an AC wall outlet, an internal combustion engine, and/or a vehicle alternator.

The lithium ion battery 10 can provide a useful electrical current to the electrical device 52 by way of reversible electrochemical reactions that occur in the electrochemical battery cells 12 when the interruptible circuit 50 is closed to connect the negative terminal 28 and the positive terminal 30 at a time when the negative electrodes 14 contain a sufficient quantity of intercalated lithium (i.e., battery discharge). The electrochemical potential difference between the negative electrode 14 and the positive electrode 16 in each cell 12—approximately 2.5 to 4.3V depending on the composition of the electrodes 14, 16—drives the oxidation of intercalated lithium contained in the negative electrodes 14. Free electrons produced by this oxidation reaction are collected by the negative-side current collectors 20 and supplied to the negative terminal 28. A flow of free electrons is harnessed and directed through the electrical device 52 from the negative terminal 28 to the positive terminal 30 and eventually to the positive electrodes 16 by way of the positive-side current collectors 24. Lithium ions, which are also produced at the negative electrodes 14, are concurrently carried through the separators 18 by the liquid electrolyte solution in route to the positive electrodes 16. The flow of free electrons through the electrical device 52 from the negative terminal 28 to the positive terminal 30 can be continuously or intermittently provided until the negative electrodes 14 are depleted of intercalated lithium and the capacity of the electrochemical battery cells 12 is spent.

The lithium ion battery 10 can be charged or re-powered at any time by applying an external voltage originating from the electrical device 52 to the electrochemical battery cells 12 to reverse the electrochemical reactions that occur during discharge. The applied external voltage compels the otherwise non-spontaneous oxidation of intercalated lithium contained in the positive electrodes 16 to produce free electrons and lithium ions. The free electrons are collected by the positive-side current collectors 24 and supplied to the positive terminal 30. A flow of the free electrons is directed to the negative terminal 28 and eventually to the negative electrodes 14 by way of the negative-side current collectors 20. The lithium ions are concurrently carried back through the separators 18 in the liquid electrolyte solution towards the negative electrodes 14. The lithium ions and the free electrons eventually reunite and replenish the negative electrodes 14 with intercalated lithium to prepare the electrochemical battery cells 12 for another discharge phase.

EXAMPLE

This Example demonstrates the lithium ionic conductivity of a porous polymer separator made according to the thermally-induced phase separation method described above in comparison to a conventional monolayer polypropylene lithium ion battery separator obtained from Celgard, LLC (Charlotte, N.C.). The porous polymer separator comprises a PEI polymer matrix. This particular separator is referred to in the remainder of this Example as the "Separator A" for brevity.

Separator A was formed by a thermally-induced phase separation method in which polyetherimide (PEI) was dissolved in a miscible mixture of, by weight, 95 parts N-methyl-2-pyrrolidone (NMP) and 5 parts water at 50° C. to form a single phase polymer solution that contained 20 wt. % PEI. Here, NMP is the real polymer solvent and water is the polymer non-solvent. Particles of Aerosil R805 (hydrophobic-treated fumed silica particles) were then added to the single phase polymer solution. The amount of these particles added was 20 wt. % based on the weight of the PEI. A film of the polymer solution was then cast onto a flat glass plate and allowed to cool. During cooling, the film transformed from clear to opaque as the PEI precipitated. The NMP was then extracted by washing the solid PEI precipitate with water. Afterwards, the solid PEI precipitate was dried, with heat, to evaporate any residual NMP along with the water to produce Separator A. A similar method could likewise be used to make a separator from other engineering polymers and their respective real polymer solvents and polymer non-solvents, as previously described.

The effective ionic conductivities of Separator A and the conventional monolayer polypropylene separator were determined by placing the separators, which were soaked with 1 M $LiPF_6$ in ethylene carbonate/diethyl carbonate (1:2 volumetric ratio) as the liquid electrolyte solution, between two stainless steel electrodes. An impedance analyzer was used to measure the bulk resistance ($R_b$) across the separators. The effective ionic conductivity of each separator was then calculated by the following equation in which "t" is the thickness of the separator, "S" is the surface area of one side of the separator facing the electrode (each side of the separator having the same surface area), and "$R_b$" is the bulk resistance as measured by the impedance analyzer.

$$\sigma_{\mathit{eff}}(mS/cm) = \frac{t}{R_b \times S}$$

The effective conductivities of Separator A and the conventional monolayer polypropylene separator are shown below in Table 2. Separator A, as indicated, demonstrated a better effective ionic conductivity.

TABLE 2

Effective Ionic Conductivity

| Separator | t (μm) | S (cm$^2$) | $R_b$ (Ω) | $\sigma_{\mathit{eff}}$ (mS/cm) |
|---|---|---|---|---|
| Separator A | 18 | 6.6 | 0.17 | 1.60 |
| Celgard 2400 | 25 | 6.6 | 0.39 | 0.97 |

The above description of preferred exemplary embodiments and specific example are merely descriptive in nature and not intended to limit the scope of the claims that follow. Each of the terms used in the appended claims should be given its ordinary and customary meaning unless specifically and unambiguously stated otherwise in the specification.

The invention claimed is:

1. A method of making a porous polymer separator that, in a lithium ion battery, is sandwiched between a negative electrode and a positive electrode to provide an electrically insulative physical barrier that mechanically separates the two electrodes, the method comprising:

preparing a single phase polymer solution that includes a polymer material dissolved in a miscible mixture of a real polymer solvent and a polymer non-solvent, the single phase polymer solution having an elevated temperature above room temperature that facilitates solvation of the polymer material in the miscible mixture of the real polymer solvent and the polymer non-solvent, the polymer non-solvent being selected from the group consisting of water, a C1-C6 aliphatic alcohol, acetone, and mixtures thereof;

forming a film from the single phase polymer solution that has a thickness of up to about 150 μm;

cooling the film from the elevated temperature to phase-separate the polymer material into a solid polymer precipitate;

exposing the solid polymer precipitate to additional polymer non-solvent to remove, by solvent exchange, the real polymer solvent from the solid polymer precipitate; and drying the solid polymer precipitate to remove the polymer non-solvent and any residual of the real polymer solvent from the solid polymer precipitate to form a polymer matrix having opposed major face surfaces and defining a network of pore openings that traverses the polymer matrix and fluidly connects the major face surfaces.

2. The method set forth in claim 1, wherein preparing the single phase polymer solution comprises:

dissolving the polymer material in the real polymer solvent at a temperature below the elevated temperature to form an initial polymer solution;

heating the initial polymer solution to the elevated temperature; and adding the polymer non-solvent to the initial polymer solution to form the single phase polymer solution.

3. The method set forth in claim 1, wherein preparing the single phase polymer solution comprises:

mixing the real polymer solvent and the polymer non-solvent at a temperature below the elevated temperature to form the miscible mixture of the real polymer solvent and the polymer non-solvent;

heating the miscible mixture of the real polymer solvent and the polymer non-solvent to the elevated temperature; and dissolving the polymer material into the miscible mixture of the real polymer solvent and the polymer non-solvent to form the single phase polymer solution.

4. The method set forth in claim 1, further comprising:

dispersing particles into the single phase polymer solution before forming the film from the single phase polymer solution, the particles comprising at least one of ceramic particles or polymer particles.

5. The method set forth in claim 4, wherein the ceramic particles are selected from the group consisting of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, and mixtures thereof, and wherein the polymer particles are selected from the group consisting of polyethylene, polypropylene, ethylene-vinyl acetate, polystyrene, an epoxy, a polyketone, and mixtures thereof.

6. The method set forth in claim 4, wherein the particles comprise fumed silica particles that have been modified through a silanol condensation reaction to include surface-substituted organosilicon polymer compounds.

7. The method set forth in claim 4, wherein the particles have particle diameters ranging from about 0.05 μm to about 3 μm, and wherein the particles are dispersed in the polymer solution in an amount that results in the polymer matrix comprising about 10 wt. % to about 95 wt. % of the polymer material and about 5 wt. % to about 90 wt. % of the particles distributed throughout the polymer matrix.

8. The method set forth in claim 7, wherein the polymer matrix comprises about 50 wt. % to about 90 wt. % of the polymer material and about 10 wt. % to about 50 wt. % of the particles distributed throughout the polymer matrix.

9. The method set forth in claim 1, wherein the polymer material is an engineering polymer material selected from the group consisting of polyetherimide, polyvinylidene fluoride, polyethersulfone, polysulfone, polyphenylsulfone, polyacrylonitrile, poly(methyl methacrylate), an aliphatic polyamide, an aromatic polyamide, cellulose and cellulose derivatives, a polycarbonate, a polyurethane, and mixtures thereof.

10. The method set forth in claim 1, wherein the real polymer solvent is selected from the group consisting of N-methyl-2-pyrrolidone, dimethyl formamide, tetrahydrofuran, dimethyl sulfoxide, ethylene carbonate, propylene carbonate, diethyl carbonate, ethylenediamine, acetone, aqueous acetic acid, aqueous sulfuric acid, and mixtures thereof.

11. The method set forth in claim 1, wherein the network of pore openings provides the polymer matrix with a void volume of about 30% to about 90%.

12. A method of making a porous polymer separator that, in a lithium ion battery, is sandwiched between a negative electrode and a positive electrode to provide an electrically insulative physical barrier that mechanically separates the two electrodes, the method comprising:

preparing a single phase polymer solution that includes a polymer material dissolved in a miscible mixture of a real polymer solvent and a polymer non-solvent, the real polymer solvent and the polymer non-solvent being present in the miscible mixture at a weight percent ranging from about 30%-99.5% and about 0.5%-70%, respectively, based on the total weight of the miscible mixture excluding the polymer material, and the single phase polymer solution having an elevated temperature above room temperature that facilitates solvation of the polymer material in the miscible mixture of the real polymer solvent and the polymer non-solvent, the polymer non-solvent being selected from the group consisting of water, a C1-C6 aliphatic alcohol, acetone, and mixtures thereof;

forming a film from the single phase polymer solution that has a desired thickness;

cooling the film from the elevated temperature to phase-separate the film into a solid polymer precipitate and a collection of liquid confinements that are uniformly disseminated throughout the solid polymer precipitate, the solid polymer precipitate being composed of at least 90% of the polymer material by weight; and exchanging the real polymer solvent present in both the solid polymer precipitate and the collection of liquid confinements with additional polymer non-solvent.

13. The method set forth in claim 12, further comprising:
drying the solid polymer precipitate to remove the polymer non-solvent and any residual of the real polymer solvent from the solid polymer precipitate to form a porous polymer separator that comprises a polymer matrix having opposed major face surfaces and a network of pore openings that extends between the major face surfaces, the polymer matrix having a thickness defined by the major face surfaces that ranges from about 10 μm to about 50 μm, and the network of pore openings providing the polymer matrix with a void volume of about 30% to about 90%.

14. The method set forth in claim 12, wherein the polymer material and the real polymer solvent included in the single phase polymer solution are selected from the following groups:
(a) Polymer material: polyetherimide, polyvinylidene fluoride, polyethersulfone, polysulfone, polyphenylsulfone, polyacrylonitrile, poly(methyl methacrylate), an aliphatic polyamide, an aromatic polyamide, cellulose and cellulose derivatives, a polycarbonate, a polyurethane, or mixtures thereof;
(b) Real polymer solvent: N-methyl-2-pyrrolidone, dimethyl formamide, tetrahydrofuran, dimethyl sulfoxide, ethylene carbonate, propylene carbonate, diethyl carbonate, ethylenediamine, acetone, aqueous acetic acid, aqueous sulfuric acid, or mixtures thereof.

15. The method set forth in claim 12, wherein the desired thickness of the film is between about 20 μm and about 150 μm.

16. The method set forth in claim 12, further comprising:
dispersing particles, which comprise at least one of ceramic particles or polymer particles, into the single phase polymer solution before forming the film, the particles having particle diameters that range from about 0.05 μm to about 3 μm, and wherein the particles are dispersed in the single phase polymer solution in an amount that results in the polymer matrix comprising about 10 wt. % to about 95 wt. % of the polymer material and about 5 wt. % to about 90 wt. % of the particles distributed throughout the polymer matrix.

17. The method set forth in claim 12, wherein the elevated temperature of the single phase polymer solution is between about 40° C. and about 80° C.

18. A method of making a porous polymer separator that, in a lithium ion battery, is sandwiched between a negative electrode and a positive electrode to provide an electrically insulative physical barrier that mechanically separates the two electrodes, the method comprising:
preparing a single phase polymer solution that includes a polymer material dissolved in a miscible mixture of a real polymer solvent and a polymer non-solvent, the polymer material being present in the single phase polymer solution at a weight percent ranging from about 5%-35%, the real polymer solvent and the polymer non-solvent being present in the miscible mixture at a weight percent ranging from about 30%-99.5% and about 0.5%-70%, respectively, based on the total weight of the miscible mixture excluding the polymer material, the single phase polymer solution having an elevated temperature ranging from about 40° C. to about 80° C. and the polymer non-solvent comprising one or more of water, a C1-C6 aliphatic alcohol, or acetone;

forming a film from the single phase polymer solution onto a substrate surface having a temperature less than the elevated temperature;

cooling the film from the elevated temperature to phase-separate the polymer material into a solid polymer precipitate;

exposing the solid polymer precipitate to additional polymer non-solvent to remove, by solvent exchange, the real polymer solvent from the solid polymer precipitate; and drying the solid polymer precipitate to form a polymer matrix having opposed major face surfaces and a network of pore openings that extends between the major face surfaces, the network of pore openings providing the polymer matrix with a void volume of about 30% to about 90%.

19. The method set forth in claim 18, further comprising:
dispersing hydrophobic-treated fumed silica particles into the single phase polymer solution before forming the film, the hydrophobic-treated fumed silica particles having particle diameters that range from about 0.05 μm to about 3 μm, and wherein the hydrophobic-treated fumed silica particles have been modified through a silanol condensation reaction to include surface-substituted organosilicon polymer compounds.

* * * * *